United States Patent
Park et al.

(10) Patent No.: US 8,556,768 B2
(45) Date of Patent: Oct. 15, 2013

(54) PLANETARY GEAR TRAIN OF AUTOMATIC TRANSMISSION FOR VEHICLES

(75) Inventors: Jongsool Park, Hwaseong-si (KR); Tae Seok Seo, Suwon-si (KR); Hyukjun Lee, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/315,718

(22) Filed: Dec. 9, 2011

(65) Prior Publication Data

US 2013/0029799 A1 Jan. 31, 2013

(30) Foreign Application Priority Data

Jul. 27, 2011 (KR) .......................... 10-2011-0074788

(51) Int. Cl.
*F16H 3/44* (2006.01)

(52) U.S. Cl.
USPC ............................ 475/286; 475/278; 475/279

(58) Field of Classification Search
None
See application file for complete search history.

(56) References Cited

U.S. PATENT DOCUMENTS

| 8,043,189 B2 * | 10/2011 | Phillips et al. ................ 475/275 |
| 2011/0045942 A1 | 2/2011 | Gumpoltsberger et al. |

FOREIGN PATENT DOCUMENTS

| JP | 2006-349153 A | 12/2006 |
| KR | 10-2008-0033789 A | 4/2008 |
| KR | 10-0903341 B1 | 6/2009 |
| KR | 10-0931050 B1 | 12/2009 |
| KR | 10-0963712 B1 | 6/2010 |

* cited by examiner

*Primary Examiner* — Erin D Bishop
(74) *Attorney, Agent, or Firm* — Morgan, Lewis & Bockius LLP (57) ABSTRACT

A planetary gear train of an automatic transmission may include an input shaft, an output gear, a first planetary gear set always outputting a negative rotation speed from a rotation speed input from the input shaft, a second planetary gear outputting the negative rotation speed input from the first planetary gear set or converting negative rotation speed into a positive rotation speed and outputting the positive rotation speed, a compound planetary gear set formed by third and fourth planetary gear sets and changing the rotation speed selectively through two paths and into nine forward speeds and one reverse speed, eight rotational members including two rotation elements connected to each other or one rotation element among the rotation elements of the first and second planetary gear sets and the compound planetary gear set, and a six friction members, and a transmission housing.

10 Claims, 5 Drawing Sheets

| SHIFT-SPEED | C1 | C2 | C3 | B1 | B2 | B3 | GEAR RATIO | STEP RATIO |
|---|---|---|---|---|---|---|---|---|
| D1 |  |  | ● |  | ● |  | 4.70 | D1/D9=7.71 |
| D2 | ● |  |  |  | ● |  | 3.02 | D1/D2=1.56 |
| D3 | ● |  | ● |  |  |  | 2.29 | D2/D3=1.32 |
| D4 | ● |  |  |  |  | ● | 1.60 | D3/D4=1.43 |
| D5 | ● |  |  | ● |  |  | 1.22 | D4/D5=1.32 |
| D6 | ● | ● |  |  |  |  | 1.00 | D5/D6=1.22 |
| D7 |  | ● |  | ● |  |  | 0.83 | D6/D7=1.20 |
| D8 |  | ● |  |  |  | ● | 0.70 | D7/D8=1.19 |
| D9 |  | ● | ● |  |  |  | 0.61 | D8/D9=1.15 |
| REV |  |  |  | ● | ● |  | -4.44 | Rev/D1=0.94 |

FIG. 4

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2011-0074788 filed Jul. 27, 2011, the entire contents of which application is incorporated herein for all purposes by this reference.

BACKGROUND OF INVENTION

1. Field of Invention

The present invention relates to an automatic transmission for vehicles. More particularly, the present invention relates to a planetary gear train of an automatic transmission for vehicles which improves power delivery performance and reduces fuel consumption.

2. Description of Related Art

Typically, a planetary gear train is realized by combining a plurality of planetary gear sets, and the planetary gear train including the plurality of planetary gear sets receives torque from a torque converter and changes and transmits the torque to an output shaft.

It is well known that when a transmission realizes a greater number of shift speeds, speed ratios of the transmission can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear).

In addition, the planetary gear train has different features such a durability, power delivery efficiency, and size depend on the layout thereof. Therefore, designs for a combining structure of a gear train are also under continuous investigation.

In addition, the planetary gear train realizes a plurality of shift-speeds. However, another friction member must be operated after one friction member is released so as to shift to a neighboring shift-speed from a view of shift control.

In addition, a step ratio between the neighboring shift-speeds should be controlled to be suitable according to the planetary gear train.

Currently, four-speed and five-speed automatic transmissions are most often found on the market. However, six-speed automatic transmissions have also been realized for enhancement of performance of power transmission and for enhanced fuel mileage of a vehicle. In addition, eight-speed automatic transmissions and tenth-speed automatic transmissions have been developed at a good pace.

Korean patent Laid-open Publication No. 10-2008-0033789 discloses a planetary gear train achieving nine forward speeds and three reverse speeds by combining four simple planetary gear sets with seven friction members (four clutches and three brakes). However, since four simple planetary gear sets and seven friction members are used according to Korean patent Laid-open Publication No. 10-2008-0033789, the planetary gear train may be heavy and long, and it is difficult for the planetary gear train to be mounted.

In addition, since seven friction members are used, a hydraulic control system for controlling them may be complex.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a planetary gear train of an automatic transmission for vehicles having advantages of achieving nine forward speeds and a reverse speed with improved controllability of friction members, suitable step ratios, and improved performance and fuel economy by combining a plurality of planetary gear sets with a plurality of friction members.

A planetary gear train of an automatic transmission for vehicles according to various aspects of the present invention may include an input shaft adapted to receive engine torque, an output gear adapted to output a shifted torque, a first planetary gear set adapted to always output a negative rotation speed by using a rotation speed input from the input shaft, a second planetary gear set adapted to output the negative rotation speed input from the first planetary gear set or to convert the negative rotation speed into a positive rotation speed and output the positive rotation speed, a compound planetary gear set formed by combining third and fourth planetary gear sets, and adapted to change the rotation speed selectively input from the input shaft through two paths and the rotation speed input from the second planetary gear set into nine forward speeds and one reverse speed and to output the nine forward speeds and one reverse speed, eight rotational members consisting of two rotation elements connected to each other or one rotation element among the rotation elements of the first and second planetary gear sets and the compound planetary gear set, and a six friction members consisting of clutches interposed between a selected rotational member among the rotational members and the input shaft or between selected rotational members, and brakes interposed between a selected rotational member among the rotational members and a transmission housing.

According to various aspects of the present invention, a planetary gear train of an automatic transmission for vehicles achieving multiple shift-speeds may include an input shaft adapted to receive engine torque, an output gear adapted to output a shifted torque, a first planetary gear set having a first sun gear, a first planet carrier, and a first ring gear, a second planetary gear set having a second sun gear, a second planet carrier, and a second ring gear, a compound planetary gear set formed by combining a third planetary gear set having a third sun gear, a third planet carrier, and a third ring gear, and a fourth planetary gear set having a fourth sun gear, a fourth planet carrier, and a fourth ring gear, a first rotational member consisting of the first sun gear and adapted to be directly connected to the input shaft, a second rotational member consisting of the first planet carrier and adapted to be directly connected to a transmission housing, a third rotational member consisting of the first ring gear and the second planet carrier, a fourth rotational member consisting of the second sun gear and the third sun gear, a fifth rotational member consisting of the second ring gear and adapted to be selectively connected to the transmission housing, a sixth rotational member consisting of the third planet carrier and the fourth ring gear, and adapted to be selectively connected to the input shaft or to the transmission housing, a seventh rotational member consisting of the third ring gear and the fourth planet carrier, and adapted to be directly connected to the output shaft, an eighth rotational member consisting of the fourth sun gear and adapted to be selectively connected to the input shaft, and a six friction members consisting of clutches interposed between a selected rotational member among the rotational members and the input shaft or between selected rotational members, and brakes interposed between a selected rotational member among the rotational members and a transmission housing is disclosed.

The first planetary gear set may be a single pinion planetary gear set, the second planetary gear set may be a double pinion planetary gear set, the third planetary gear set may be a single pinion planetary gear set, and the fourth planetary gear set may be a single pinion planetary gear set.

The six friction members may include a first clutch interposed between the input shaft and the eighth rotational member, a second clutch interposed between the input shaft and the sixth rotational member, a third clutch interposed between the third rotational member and the fourth rotational member, a first brake interposed between the fifth rotational member and the transmission housing, a second brake interposed between the sixth rotational member and the transmission housing, and a third brake interposed between the fourth rotational member and the transmission housing.

The multiple shift-speeds may includes a first forward speed achieved by operating the third clutch and the second brake, a second forward speed achieved by operating the first clutch and the second brake, a third forward speed achieved by operating the first clutch and the third clutch, a fourth forward speed achieved by operating the first clutch and the third brake, a fifth forward speed achieved by operating the first clutch and the first brake, a sixth forward speed achieved by operating the first clutch and the second clutch, a seventh forward speed achieved by operating the second clutch and the first brake, an eighth forward speed achieved by operating the second clutch and the third brake, a ninth forward speed achieved by operating the second clutch and the third clutch, and a reverse speed achieved by operating the first brake and the second brake.

According to other aspects of the present invention, a planetary gear train of an automatic transmission for vehicles may include an input shaft adapted to receive engine torque, an output gear adapted to output a shifted torque, a first planetary gear set having a first sun gear, a first planet carrier, and a first ring gear, a second planetary gear set having a second sun gear, a second planet carrier, and a second ring gear, a compound planetary gear set formed by combining a third planetary gear set having a third sun gear, a third planet carrier, and a third ring gear, and a fourth planetary gear set having a fourth sun gear, a fourth planet carrier, and a fourth ring gear, a first rotational member consisting of the first sun gear and adapted to be directly connected to the input shaft, a second rotational member consisting of the first planet carrier and adapted to be directly connected to a transmission housing, a third rotational member consisting of the first ring gear and the second ring gear, a fourth rotational member consisting of the second sun gear and the third sun gear, a fifth rotational member consisting of the second planet carrier and adapted to be selectively connected to the transmission housing, a sixth rotational member consisting of the third planet carrier and the fourth ring gear, and adapted to be selectively connected to the input shaft or to the transmission housing, a seventh rotational member consisting of the third ring gear and the fourth planet carrier, and adapted to be directly connected to the output shaft, an eighth rotational member consisting of the fourth sun gear and adapted to be selectively connected to the input shaft, and a six friction members consisting of clutches interposed between a selected rotational member among the rotational members and the input shaft or between selected rotational members, and brakes interposed between a selected rotational member among the rotational members and a transmission housing is disclosed.

The first planetary gear set may be a single pinion planetary gear set, the second planetary gear set may be a single pinion planetary gear set, the third planetary gear set may be a single pinion planetary gear set, and the fourth planetary gear set may be a single pinion planetary gear set.

The six friction members may include a first clutch interposed between the input shaft and the eighth rotational member, a second clutch interposed between the input shaft and the sixth rotational member, a third clutch interposed between the third rotational member and the fourth rotational member, a first brake interposed between the fifth rotational member and the transmission housing, a second brake interposed between the sixth rotational member and the transmission housing, and a third brake interposed between the fourth rotational member and the transmission housing.

According to other aspects of the present invention, a planetary gear train of an automatic transmission for vehicles may include an input shaft adapted to receive engine torque, an output gear adapted to output a shifted torque, a first planetary gear set having a first sun gear, a first planet carrier, and a first ring gear, a second planetary gear set having a second sun gear, a second planet carrier, and a second ring gear, a compound planetary gear set having a third sun gear, a fourth sun gear, a common planet carrier, and a common ring gear, a first rotational member consisting of the first sun gear and adapted to be directly connected to the input shaft, a second rotational member consisting of the first planet carrier and adapted to be directly connected to a transmission housing, a third rotational member consisting of the first ring gear and the second planet carrier, a fourth rotational member consisting of the second sun gear and the third sun gear, a fifth rotational member consisting of the second ring gear and adapted to be selectively connected to the transmission housing, a sixth rotational member consisting of the common planet carrier, and adapted to be selectively connected to the input shaft or to the transmission housing, a seventh rotational member consisting of the common ring gear and adapted to be directly connected to the output shaft, an eighth rotational member consisting of the fourth sun gear and adapted to be selectively connected to the input shaft, and a six friction members consisting of clutches interposed between a selected rotational member among the rotational members and the input shaft or between selected rotational members, and brakes interposed between a selected rotational member among the rotational members and a transmission housing.

The first planetary gear set may be a single pinion planetary gear set, the second planetary gear set is a double pinion planetary gear set, and the compound planetary gear set is formed by combining the third planetary gear set being a single pinion planetary gear set and the fourth planetary gear set being a double pinion planetary gear set.

The six friction members may include a first clutch interposed between the input shaft and the sixth rotational member, a second clutch interposed between the input shaft and the eighth rotational member, a third clutch interposed between the third rotational member and the fourth rotational member, a first brake interposed between the fifth rotational member and the transmission housing, a second brake interposed between the sixth rotational member and the transmission housing, and a third brake interposed between the fourth rotational member and the transmission housing.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining various embodiments will be omitted, and the same constituent elements are denoted by the same reference numerals in this specification.

In the detailed description, ordinal numbers are used for distinguishing constituent elements having the same terms, and have no specific meanings.

Figure 1:
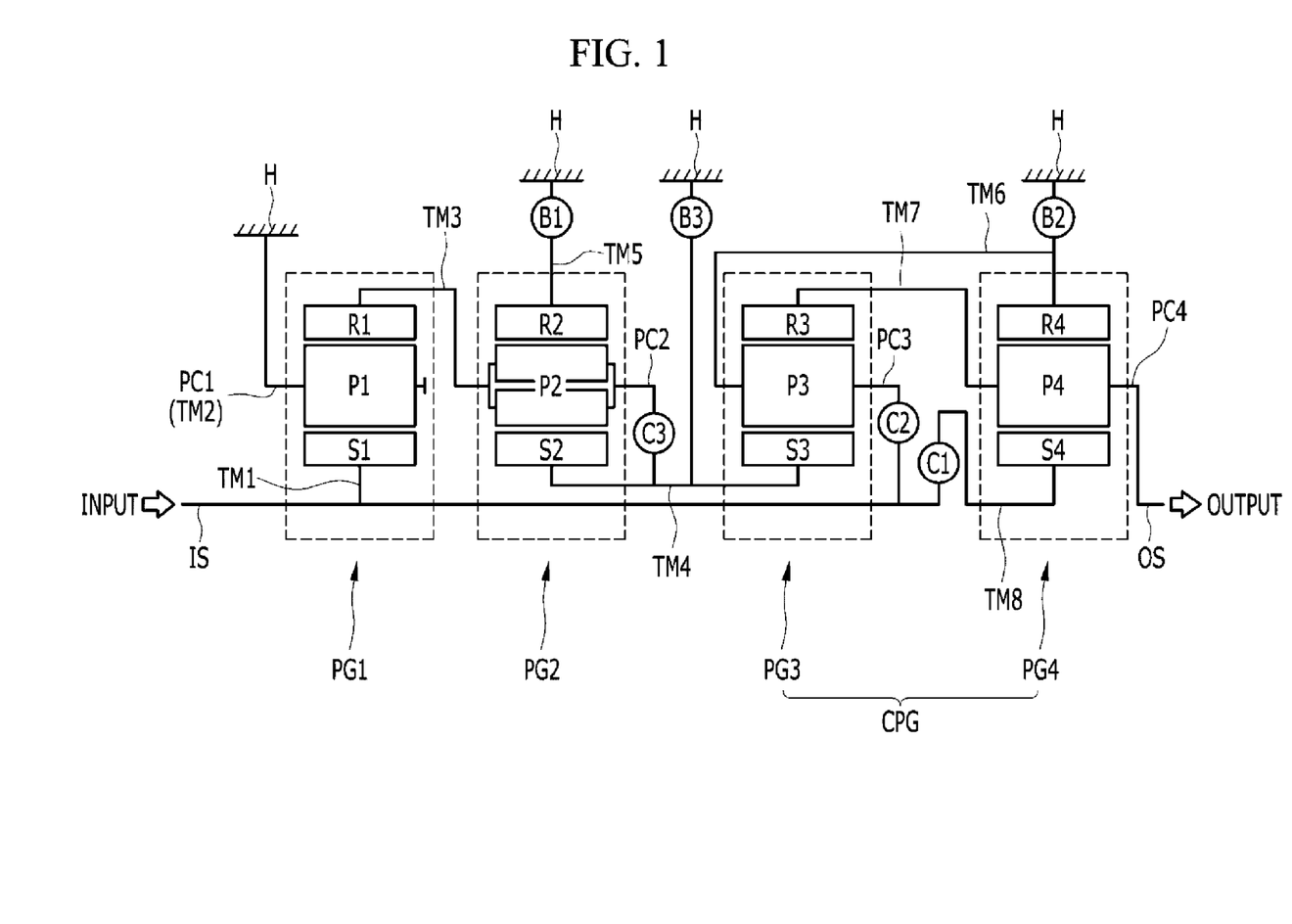
FIG. 1 is a schematic diagram of an exemplary planetary gear train according to the present invention.
Figure 2:
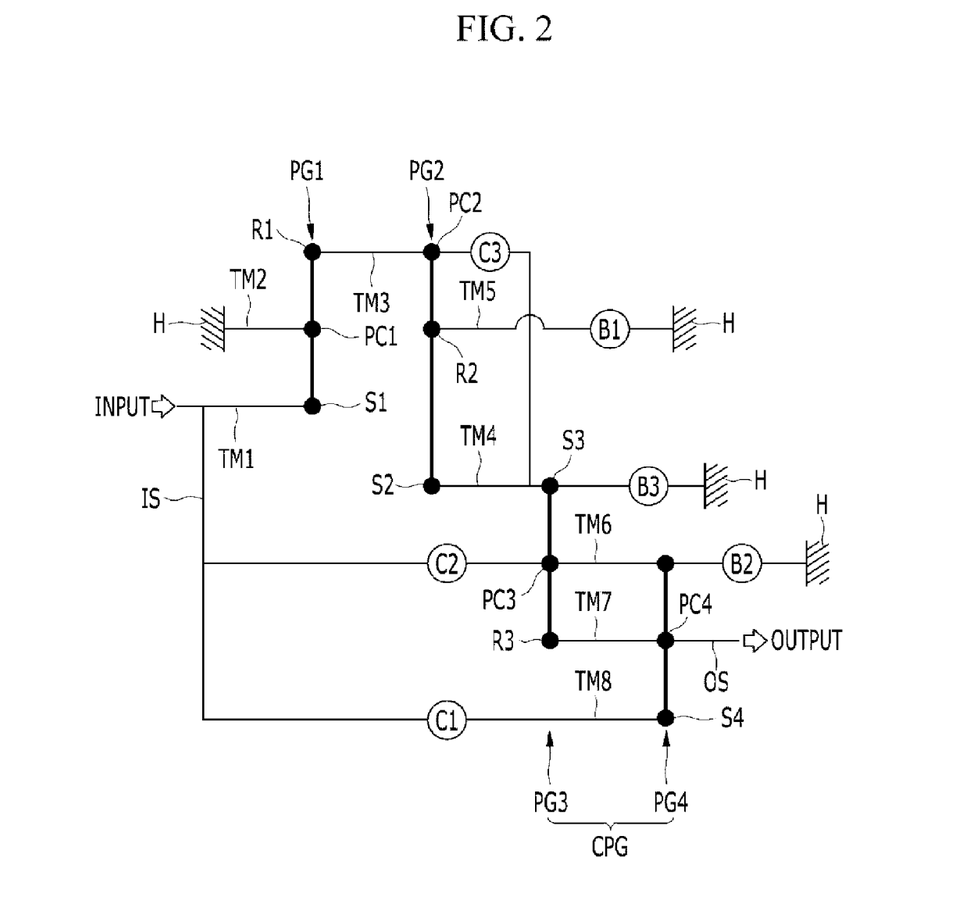
FIG. 2 is a diagram showing connections of the planetary gear train of FIG. 1.

FIG. 1 is a schematic diagram of a planetary gear train according to various embodiments of the present invention, and FIG. 2 is a diagram showing connections of a planetary gear train according to such embodiments of the present invention.

Referring to FIG. 1 and FIG. 2, a planetary gear train according to various embodiments of the present invention includes first, second, third, and fourth planetary gear sets PG1, PG2, PG3, and PG4 disposed on the same axis, an input shaft IS, an output shaft OS, eight rotational members TM1-TM8 directly or selectively connecting rotation elements of the first, second, third, and fourth planetary gear sets PG1, PG2, PG3, and PG4, six friction members C1-C3 and B1-B3, and a transmission housing H.

The first and second planetary gear sets PG1 and PG2 are operated independently. Two rotation elements of the third planetary gear sets PG3 are fixedly connected to two rotation elements of the fourth planetary gear sets PG4 such that the third and fourth planetary gear sets PG3 and PG4 are operated as one compound planetary gear set CPG.

A rotation speed input from the input shaft IS is changed by the first and second planetary gear sets PG1 and PG2 and the compound planetary gear set CPG and is output through the output shaft OS.

In addition, the planetary gear sets are disposed in a sequence of the first and second planetary gear sets PG1 and PG2 and the compound planetary gear set CPG from an engine to the rear.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set, and includes a first sun gear S1, a first ring gear R1, and a first planet carrier PC1 rotatably supporting a first pinion P1 engaged with the first sun gear S1 and the first ring gear R1

The second planetary gear set PG2 is a double pinion planetary gear set, and includes a second sun gear S2, a second ring gear R2, and a second planet carrier PC2 rotatably supporting a pair of second pinions P2 engaged with the second sun gear S2 and the second ring gear R2.

The third planetary gear set PG3 is a single pinion planetary gear set, and includes a third sun gear S3, a third ring gear R3, and a third planet carrier PC3 rotatably supporting a third pinion P3 engaged with the third sun gear S3 and the third ring gear R3.

The fourth planetary gear set PG4 is a single pinion planetary gear set, and includes a fourth sun gear S4, a fourth ring gear R4, and a fourth planet carrier PC4 rotatably supporting a fourth pinion P4 engaged with the fourth sun gear S4 and the fourth ring gear R4.

At least one of rotation elements of the first and second planetary gear sets PG1 and PG2 and the third and fourth planetary gear sets PG3 and PG4 forming the compound planetary gear set CPG is directly connected to each other.

In further detail, the first ring gear R1 of the first planetary gear set PG1 is directly connected to the second planet carrier PC2 of the second planetary gear set PG2.

The second sun gear S2 of the second planetary gear set PG2 is directly connected to the third sun gear S3 of the third planetary gear set PG3.

The third ring gear R3 of the third planetary gear set PG3 is directly connected to the fourth planet carrier PC4 of the fourth planetary gear set PG4, and the third planet carrier PC3 of the third planetary gear set PG3 is directly connected to the fourth ring gear R4 of the fourth planetary gear set PG4.

Accordingly, the planetary gear train according to various embodiments may include eight rotational members TM1-TM8.

The first rotational member TM1 consists of the first sun gear S1, and is adapted to be connected to the input shaft IS and be always operated as an input element.

The second rotational member TM2 consists of the first planet carrier PC1, and is adapted to be directly connected to the transmission housing H and be always operated as a fixed element.

The third rotational member TM3 consists of the first ring gear R1 and the second planet carrier PC2, and is adapted to be operated as an output element of the first planetary gear set PG1 and as an input element of the second planetary gear set PG2.

The fourth rotational member TM4 consists of the second sun gear S2 and the third sun gear S3, and is adapted to be selectively connected to the third rotational member TM3 and be operated as a selective input element of the compound planetary gear set CPG or to be selectively connected to the transmission housing H and be operated as a selective fixed element.

The fifth rotational member TM5 consists of the second ring gear R2, and is adapted to be selectively connected to the transmission housing H and be operated as a selective fixed element.

The sixth rotational member TM6 consists of the third planet carrier PC3 and the fourth ring gear R4, and is adapted to be selectively connected to the input shaft IS and be operated as a selective input element or to be selectively connected to the transmission housing H and be operated as a selective fixed element.

The seventh rotational member TM7 consists of the third ring gear R3 and the fourth planet carrier PC4, and is adapted to be directly connected to the output shaft OS and be operated as a final output element.

The eighth rotational member TM8 consists of the fourth sun gear S4, and is adapted to be selectively connected to the input shaft IS and be operated as a selective input element.

Clutches C1, C2, and C3 are interposed respectively between selectively connected rotational members among the rotational members TM1-TM8.

Rotational members operated as the selective fixed elements among the rotational member TM1-TM8 are connected to the transmission housing H by interposing brakes B1, B2, and B3 therebetween.

A first clutch C1 is interposed between the input shaft IS and the eighth rotational member TM8 so as to operate the eighth rotational member TM8 as the selective input element.

A second clutch C2 is interposed between the input shaft IS and the sixth rotational member TM6 so as to operate the sixth rotational member TM6 as the selective input element.

A third clutch C3 is interposed between the third rotational member TM3 and the fourth rotational member TM4 such that the second planetary gear set PG2 can be direct-coupling state and torque of the second planetary gear set PG2 can be input to the fourth rotational member TM4.

A first brake B1 is interposed between the fifth rotational member TM5 and the transmission housing H so as to operate the fifth rotational member TM5 as the selective fixed element.

A second brake B2 is interposed between the sixth rotational member TM6 and the transmission housing H so as to operate the sixth rotational member TM6 as the selective fixed element.

A third brake B3 is interposed between the fourth rotational member TM4 and the transmission housing H so as to operate the fourth rotational member TM4 as the selective fixed element.

Friction members consisting of the first, second, and third clutches C1, C2, and C3 and the first, second, and third brakes B1, B2, and B3 are conventional multi-plate friction elements of wet type that are operated by hydraulic pressure.

Figure 3:
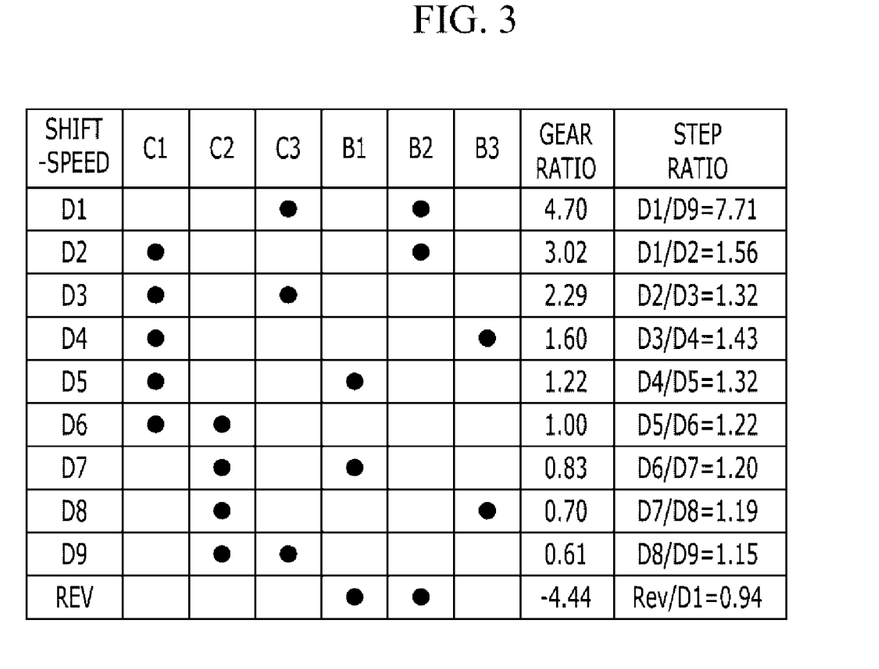
FIG. 3 is an operational chart of friction members at each shift-speed applied to a planetary gear train of FIG. 1.

FIG. 3 is an operational chart of friction members at each shift-speed applied to a planetary gear train according to various embodiments of the present invention.

Referring to FIG. 3, two friction members are operated at each shift-speed to according various embodiments of the present invention.

The third clutch C3 and the second brake B2 are operated at a first forward speed D1.

The first clutch C1 and the second brake B2 are operated at a second forward speed D2.

The first clutch C1 and the third clutch C3 are operated at a third forward speed D3.

The first clutch C1 and the third brake B3 are operated at a fourth forward speed D4.

The first clutch C1 and the first brake B1 are operated at a fifth forward speed D5.

The first clutch C1 and the second clutch C2 are operated at a sixth forward speed D6.

The second clutch C2 and the first brake B1 are operated at a seventh forward speed D7.

The second clutch C2 and the third brake B3 are operated at an eighth forward speed D8.

The second clutch C2 and the third clutch C3 are operated at a ninth forward speed D9.

The first brake B1 and the second brake B2 are operated at a reverse speed REV.

In a state that the rotation speed of the input shaft IS is input to the first rotational member TM1, the second rotational member TM2 is always operated as the fixed element. Therefore, the first planetary gear set PG1 always outputs a negative rotation speed.

The second planetary gear set PG2 directly outputs the negative rotation speed input from the first planetary gear set PG1, or converts the negative rotation speed into the positive rotation speed and outputs the positive rotation speed.

The compound planetary gear set CPG converts the positive rotation speed and the negative rotation speed input from the second planetary gear set PG2 and the rotation speed of the input shaft IS input through two paths TM6 and TM8 into nine forward speeds and one reverse speed, and outputs the nine forward speeds and one reverse speed.

The planetary gear train according to various embodiments of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform as shown in FIG. 3.

Figure 4:
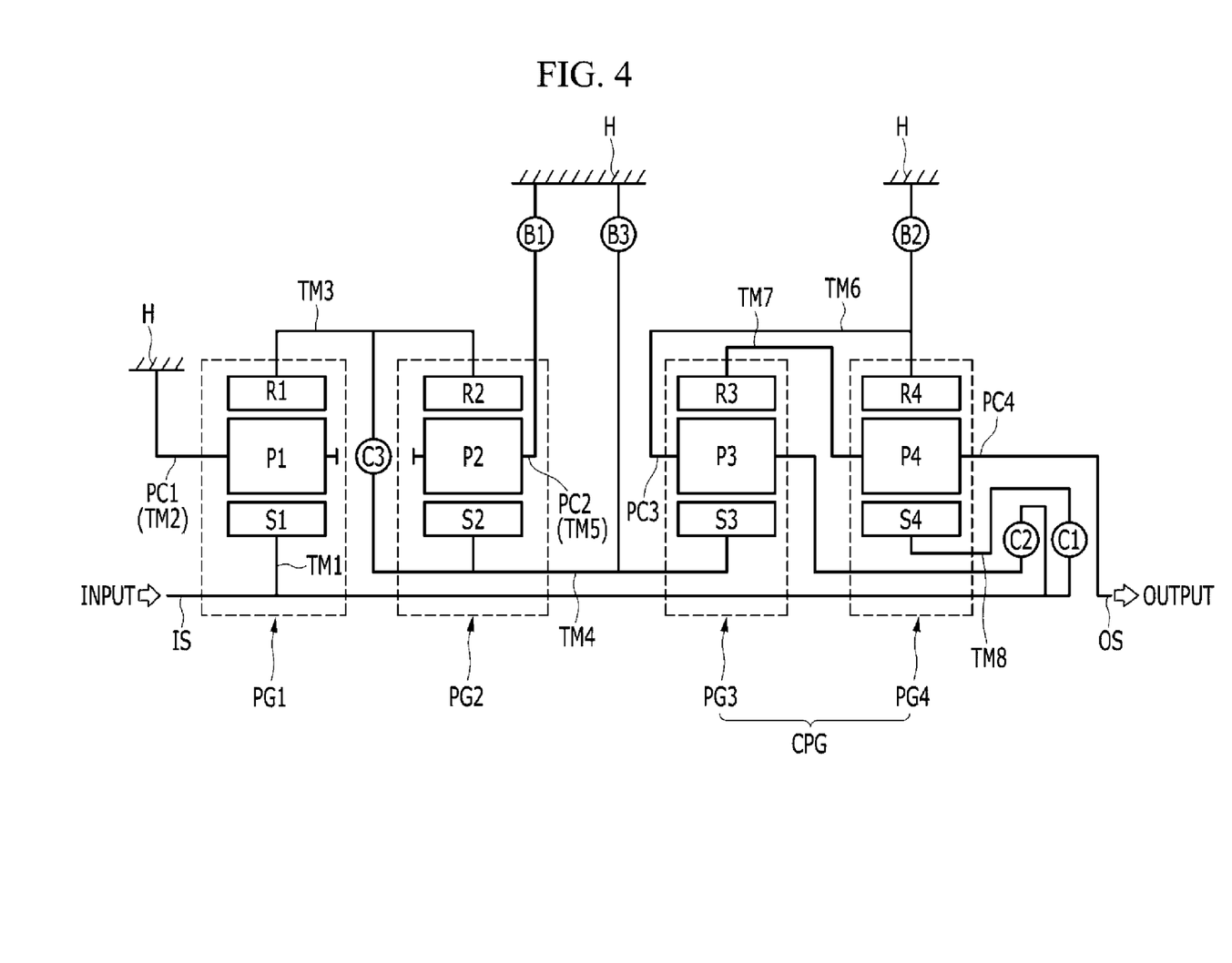
FIG. 4 is a schematic diagram of an exemplary planetary gear train according to the present invention.

FIG. 4 is a schematic diagram of a planetary gear train according to various embodiments of the present invention.

Referring to FIG. 4, the second planetary gear set PG2 of various embodiments may be a double pinion planetary gear set, and in other embodiments the second planetary gear set PG2 may be a single pinion planetary gear set.

Therefore, rotational members of the exemplary embodiment of FIG. 4 differ from those of the exemplary embodiment illustrated in FIG. 1.

That is, the first rotational member TM1 consists of the first sun gear S1, and is adapted to be connected to the input shaft IS and be always operated as the input element.

The second rotational member TM2 consists of the first planet carrier PC1, and is adapted to be directly connected to the transmission housing H and be always operated as the fixed element.

The third rotational member TM3 consists of the first ring gear R1 and the second ring gear R2, and is adapted to be operated as an output element of the first planetary gear set PG1 and as an input element of the second planetary gear set PG2.

The fourth rotational member TM4 consists of the second sun gear S2 and the third sun gear S3, and is adapted to be selectively connected to the third rotational member TM3 and be operated as a selective input element of the compound planetary gear set CPG or to be selectively connected to the transmission housing H and be operated as a selective fixed element.

The fifth rotational member TM5 consists of the second planet carrier PC2, and is adapted to be selectively connected to the transmission housing H and be operated as a selective fixed element.

The sixth rotational member TM6 consists of the third planet carrier PC3 and the fourth ring gear R4, and is adapted to be selectively connected to the input shaft IS and be operated as a selective input element or to be selectively connected to the transmission housing H and be operated as a selective fixed element.

The seventh rotational member TM7 consists of the third ring gear R3 and the fourth planet carrier PC4, and is adapted to be directly connected to the output shaft OS and be operated as a final output element.

The eighth rotational member TM8 consists of the fourth sun gear S4, and is adapted to be selectively connected to the input shaft IS and be operated as a selective input element.

The clutches C1, C2, and C3 are interposed respectively between selectively connected rotational members among the rotational members TM1-TM8.

The rotational members operated as the selective fixed elements among the rotational member TM1-TM8 are connected to the transmission housing H by interposing brakes B1, B2, and B3 therebetween.

The first clutch C1 is interposed between the input shaft IS and the eighth rotational member TM8 so as to operate the eighth rotational member TM8 as the selective input element.

The second clutch C2 is interposed between the input shaft IS and the sixth rotational member TM6 so as to operate the sixth rotational member TM6 as the selective input element.

The third clutch C3 is interposed between the third rotational member TM3 and the fourth rotational member TM4 such that the second planetary gear set PG2 can be direct-coupling state and torque of the second planetary gear set PG2 can be input to the fourth rotational member TM4.

The first brake B1 is interposed between the fifth rotational member TM5 and the transmission housing H so as to operate the fifth rotational member TM5 as the selective fixed element.

The second brake B2 is interposed between the sixth rotational member TM6 and the transmission housing H so as to operate the sixth rotational member TM6 as the selective fixed element.

The third brake B3 is interposed between the fourth rotational member TM4 and the transmission housing H so as to operate the fourth rotational member TM4 as the selective fixed element.

The exemplary embodiment of FIG. 4 differs from the exemplary embodiment illustrated in FIG. 1 in the third rotational member TM3 and the fifth rotational member TM5, but operation of the friction members at each shift-speed and shifting processes of the exemplary embodiment of FIG. 4 are the same as those of FIG. 1. Therefore, detailed description will be omitted.

Figure 5:
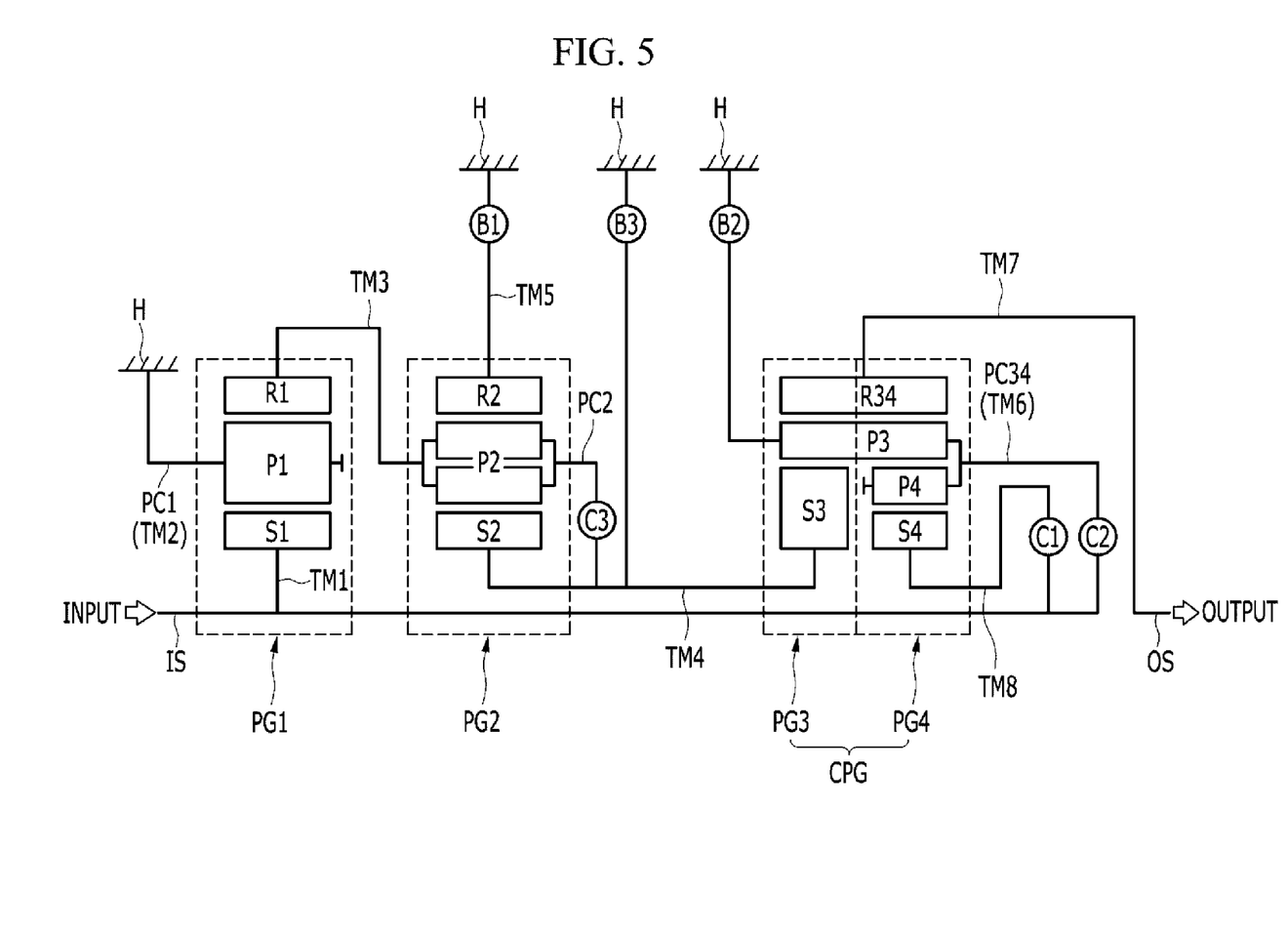
FIG. 5 is a schematic diagram of an exemplary planetary gear train according to the present invention.

FIG. 5 is a schematic diagram of a planetary gear train according to various embodiments of the present invention.

Referring to FIG. 5, the compound planetary gear set CPG is formed by two single pinion planetary gear sets similar to that shown in FIG. 1, but the compound planetary gear set CPG is a compound planetary gear set of Ravingneaux type according to the exemplary embodiment of FIG. 5.

That is, the compound planetary gear set CPG used in various embodiments is formed by combining the third planetary gear set PG3 being a single pinion planetary gear set and the fourth planetary gear set PG4 being a double pinion planetary gear set so as to be the compound planetary gear set of Ravingneaux type having a ring gear and a planet carrier in common.

Therefore, the compound planetary gear set CPG is operated by four rotation elements consisting of the ring gear, the planet carrier, and two sun gears. For convenience of explanation, the ring gear is called a common ring gear R34, the planet carrier is called a common planet carrier PC34, the sun gear engaged with a long pinion P3 is called a third sun gear S3, and the sun gear engaged with a short pinion P4 is called a fourth sun gear S4.

The compound planetary gear set CPG includes the fourth, sixth, seventh, and eighth rotational members TM4, TM6, TM7, and TM8.

Therefore, rotational members of the exemplary embodiment of FIG. 5 differ from those of the exemplary embodiment shown in FIG. 1.

That is, the first rotational member TM1 consists of the first sun gear S1, and is adapted to be connected to the input shaft IS and be always operated as the input element.

The second rotational member TM2 consists of the first planet carrier PC1, and is adapted to be directly connected to the transmission housing H and be always operated as the fixed element.

The third rotational member TM3 consists of the first ring gear R1 and the second planet carrier PC2, and is adapted to be operated as an output element of the first planetary gear set PG1 and as an input element of the second planetary gear set PG2.

The fourth rotational member TM4 consists of the second sun gear S2 and the third sun gear S3.

The fifth rotation element TM5 consists of the second ring gear R2, and is adapted to be selectively connected to the transmission housing H and be operated as a selective fixed element.

The sixth rotational member TM6 consists of the common planet carrier PC34, and is adapted to be selectively connected to the input shaft IS or to the transmission housing H.

The seventh rotational member TM7 consists of the common ring gear R34, and is adapted to be directly connected to the output shaft OS.

The eighth rotational member TM8 consists of the fourth sun gear S4, is adapted to be selectively connected to the input shaft IS.

The clutches C1, C2, and C3 are interposed respectively between selectively connected rotational members among the rotational members TM1-TM8.

The rotational members operated as the selective fixed elements among the rotational member TM1-TM8 are connected to the transmission housing H by interposing brakes B1, B2, and B3 therebetween.

The first clutch C1 is interposed between the input shaft IS and the sixth rotational member TM6 so as to operate the sixth rotational member TM6 as the selective input element.

The second clutch C2 is interposed between the input shaft IS and the eighth rotational member TM8 so as to operate the eighth rotational member TM8 as the selective input element.

The third clutch C3 is interposed between the third rotational member TM3 and the fourth rotational member TM4 such that the second planetary gear set PG2 can be direct-coupling state and torque of the second planetary gear set PG2 can be input to the fourth rotational member TM4.

The first brake B1 is interposed between the fifth rotational member TM5 and the transmission housing H so as to operate the fifth rotational member TM5 as the selective fixed element.

The second brake B2 is interposed between the sixth rotational member TM6 and the transmission housing H so as to operate the sixth rotational member TM6 as the selective fixed element.

The third brake B3 is interposed between the fourth rotational member TM4 and the transmission housing H so as to operate the fourth rotational member TM4 as the selective fixed element.

The exemplary embodiment of FIG. 5 differs from the exemplary embodiment shown in FIG. 1 in the sixth rotational member TM6, the seventh rotational member TM7, and positions of the first clutch C1 and the second clutch C2, but operation of the friction members at each shift-speed and shifting processes of the exemplary embodiment of FIG. 5 are the same as those of the exemplary embodiment shown in FIG. 1. Therefore, detailed description will be omitted.

The planetary gear train according to exemplary embodiments of the present invention combines four planetary gear sets with the six friction members such that the nine forward speeds and one reverse speed can be achieved by operating the selected two friction members at each shift-speed.

Since six friction members are used, a hydraulic control system controlling the friction members can be simplified, and cost and weight may be reduced. In addition, it is easy for the planetary gear train to be mounted.

A sequential shifting is performed by releasing one friction member and operating another friction member. Therefore, shift control may be facilitated.

In addition, speed ratio characteristic and a step ratio between neighboring shift-speeds at low gear ratio/high gear ratio demanded by vehicle power performance is almost uniform.

For convenience in explanation and accurate definition in the appended claims, the terms rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for vehicles achieving multiple shift-speeds, the planetary gear train comprising:
    an input shaft adapted to receive engine torque;
    an output gear adapted to output a shifted torque;
    a first planetary gear set having a first sun gear, a first planet carrier, and a first ring gear;
    a second planetary gear set having a second sun gear, a second planet carrier, and a second ring gear;
    a compound planetary gear set formed by combining a third planetary gear set having a third sun gear, a third planet carrier, and a third ring gear, and a fourth planetary gear set having a fourth sun gear, a fourth planet carrier, and a fourth ring gear;
    a first rotational member consisting of the first sun gear and adapted to be directly connected to the input shaft;
    a second rotational member consisting of the first planet carrier and adapted to be directly connected to a transmission housing;
    a third rotational member consisting of the first ring gear and the second planet carrier;
    a fourth rotational member consisting of the second sun gear and the third sun gear;
    a fifth rotational member consisting of the second ring gear and adapted to be selectively connected to the transmission housing;
    a sixth rotational member consisting of the third planet carrier and the fourth ring gear, and adapted to be selectively connected to the input shaft or to the transmission housing;
    a seventh rotational member consisting of the third ring gear and the fourth planet carrier, and adapted to be directly connected to the output shaft;
    an eighth rotational member consisting of the fourth sun gear and adapted to be selectively connected to the input shaft; and
    six friction members consisting of clutches and brakes, the clutches being interposed between a selected rotational member among the rotational members and the input shaft or between selected rotational members, and the brakes being; interposed between a selected rotational member among the rotational members and the transmission housing.

2. The planetary gear train of claim 1, wherein the first planetary gear set is a single pinion planetary gear set, the second planetary gear set is a double pinion planetary gear set, the third planetary gear set is a single pinion planetary gear set, and the fourth planetary gear set is a single pinion planetary gear set.

3. The planetary gear train of claim 1, wherein the six friction members comprise:
    a first clutch interposed between the input shaft and the eighth rotational member;
    a second clutch interposed between the input shaft and the sixth rotational member;
    a third clutch interposed between the third rotational member and the fourth rotational member;
    a first brake interposed between the fifth rotational member and the transmission housing;
    a second brake interposed between the sixth rotational member and the transmission housing; and
    a third brake interposed between the fourth rotational member and the transmission housing.

4. The planetary gear train of claim 3, wherein the multiple shift-speeds comprise:
    a first forward speed achieved by operating the third clutch and the second brake;
    a second forward speed achieved by operating the first clutch and the second brake;
    a third forward speed achieved by operating the first clutch and the third clutch;
    a fourth forward speed achieved by operating the first clutch and the third brake;
    a fifth forward speed achieved by operating the first clutch and the first brake;
    a sixth forward speed achieved by operating the first clutch and the second clutch;
    a seventh forward speed achieved by operating the second clutch and the first brake;
    an eighth forward speed achieved by operating the second clutch and the third brake;
    a ninth forward speed achieved by operating the second clutch and the third clutch; and a reverse speed achieved by operating the first brake and the second brake.

5. A planetary gear train of an automatic transmission for vehicles, comprising:
an input shaft adapted to receive engine torque;
an output gear adapted to output a shifted torque;
a first planetary gear set having a first sun gear, a first planet carrier, and a first ring gear;
a second planetary gear set having a second sun gear, a second planet carrier, and a second ring gear;
a compound planetary gear set formed by combining a third planetary gear set having a third sun gear, a third planet carrier, and a third ring gear, and a fourth planetary gear set having a fourth sun gear, a fourth planet carrier, and a fourth ring gear;
a first rotational member consisting of the first sun gear and adapted to be directly connected to the input shaft;
a second rotational member consisting of the first planet carrier and adapted to be directly connected to a transmission housing;
a third rotational member consisting of the first ring gear and the second ring gear;
a fourth rotational member consisting of the second sun gear and the third sun gear;
a fifth rotational member consisting of the second planet carrier and adapted to be selectively connected to the transmission housing;
a sixth rotational member consisting of the third planet carrier and the fourth ring gear, and adapted to be selectively connected to the input shaft or to the transmission housing;
a seventh rotational member consisting of the third ring gear and the fourth planet carrier, and adapted to be directly connected to the output shaft;
an eighth rotational member consisting of the fourth sun gear and adapted to be selectively connected to the input shaft; and
six friction members consisting of clutches and brakes, the clutches being interposed between a selected rotational member among the rotational members and the input shaft or between selected rotational members, and the brakes being; interposed between a selected rotational member among the rotational members and the transmission housing.

6. The planetary gear train of claim 5, wherein the first planetary gear set is a single pinion planetary gear set, the second planetary gear set is a single pinion planetary gear set, the third planetary gear set is a single pinion planetary gear set, and the fourth planetary gear set is a single pinion planetary gear set.

7. The planetary gear train of claim 5, wherein the six friction members comprise:
a first clutch interposed between the input shaft and the eighth rotational member;
a second clutch interposed between the input shaft and the sixth rotational member;
a third clutch interposed between the third rotational member and the fourth rotational member;
a first brake interposed between the fifth rotational member and the transmission housing;
a second brake interposed between the sixth rotational member and the transmission housing; and
a third brake interposed between the fourth rotational member and the transmission housing.

8. A planetary gear train of an automatic transmission for vehicles, comprising:
an input shaft adapted to receive engine torque;
an output gear adapted to output a shifted torque;
a first planetary gear set having a first sun gear, a first planet carrier, and a first ring gear;
a second planetary gear set having a second sun gear, a second planet carrier, and a second ring gear;
a compound planetary gear set having a third sun gear, a fourth sun gear, a common planet carrier, and a common ring gear;
a first rotational member consisting of the first sun gear and adapted to be directly connected to the input shaft;
a second rotational member consisting of the first planet carrier and adapted to be directly connected to a transmission housing;
a third rotational member consisting of the first ring gear and the second planet carrier;
a fourth rotational member consisting of the second sun gear and the third sun gear;
a fifth rotational member consisting of the second ring gear and adapted to be selectively connected to the transmission housing;
a sixth rotational member consisting of the common planet carrier, and adapted to be selectively connected to the input shaft or to the transmission housing;
a seventh rotational member consisting of the common ring gear and adapted to be directly connected to the output shaft;
an eighth rotational member consisting of the fourth sun gear and adapted to be selectively connected to the input shaft; and
six friction members consisting of clutches and brakes, the clutches being interposed between a selected rotational member among the rotational members and the input shaft or between selected rotational members, and the brakes being; interposed between a selected rotational member among the rotational members and the transmission housing.

9. The planetary gear train of claim 8, wherein the first planetary gear set is a single pinion planetary gear set, and the second planetary gear set is a double pinion planetary gear set.

10. The planetary gear train of claim 8, wherein the six friction members comprise:
a first clutch interposed between the input shaft and the sixth rotational member;
a second clutch interposed between the input shaft and the eighth rotational member;
a third clutch interposed between the third rotational member and the fourth rotational member;
a first brake interposed between the fifth rotational member and the transmission housing;
a second brake interposed between the sixth rotational member and the transmission housing; and
a third brake interposed between the fourth rotational member and the transmission housing.

* * * * *